Nov. 23, 1954  H. O. BARNES  2,695,371
CONTROL TRANSFORMER AND GENERATOR
Filed Jan. 18, 1951   3 Sheets-Sheet 3
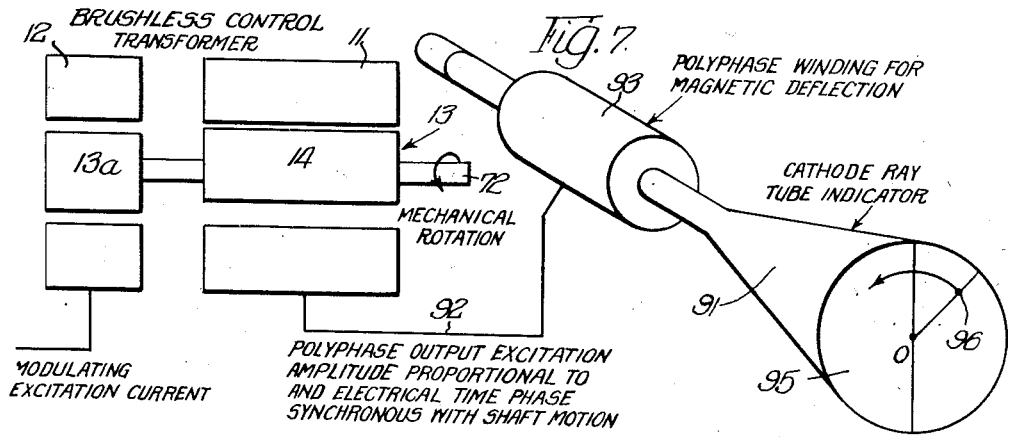
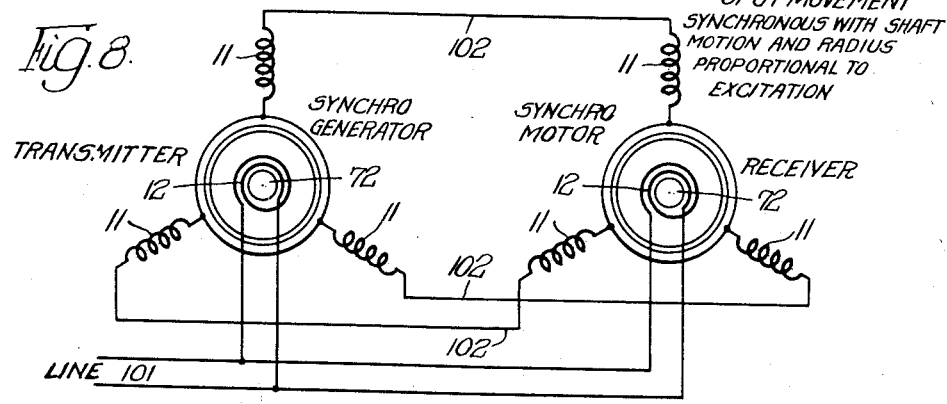
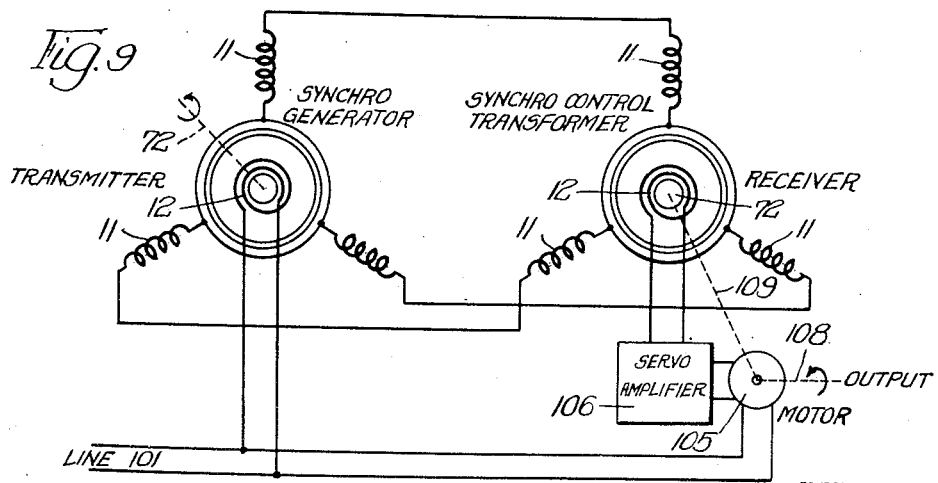
INVENTOR.
Herbert O. Barnes,
BY Brown, Jackson,
Boettcher & Dienner
attys United States Patent Office
2,695,371
Patented Nov. 23, 1954

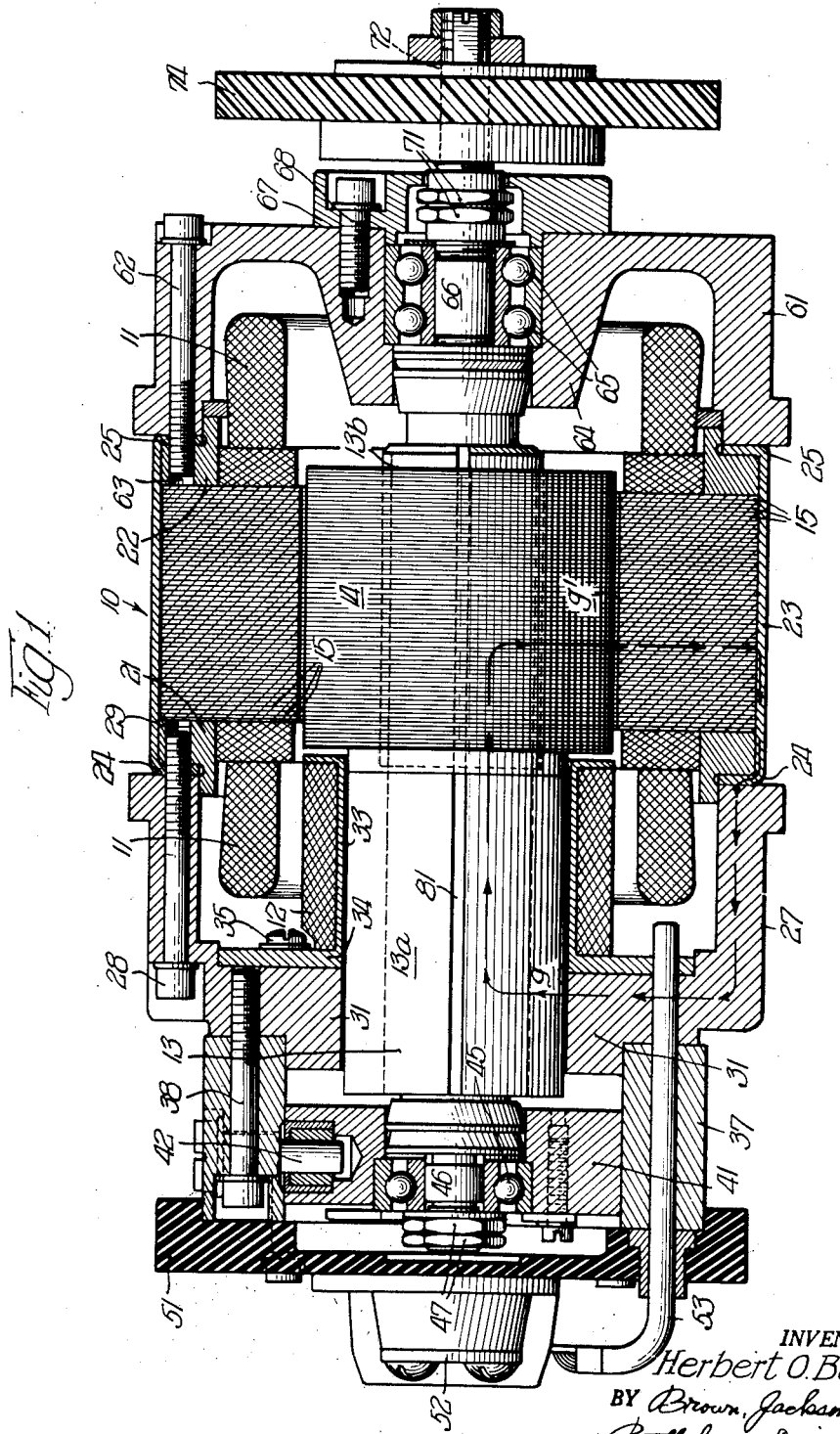

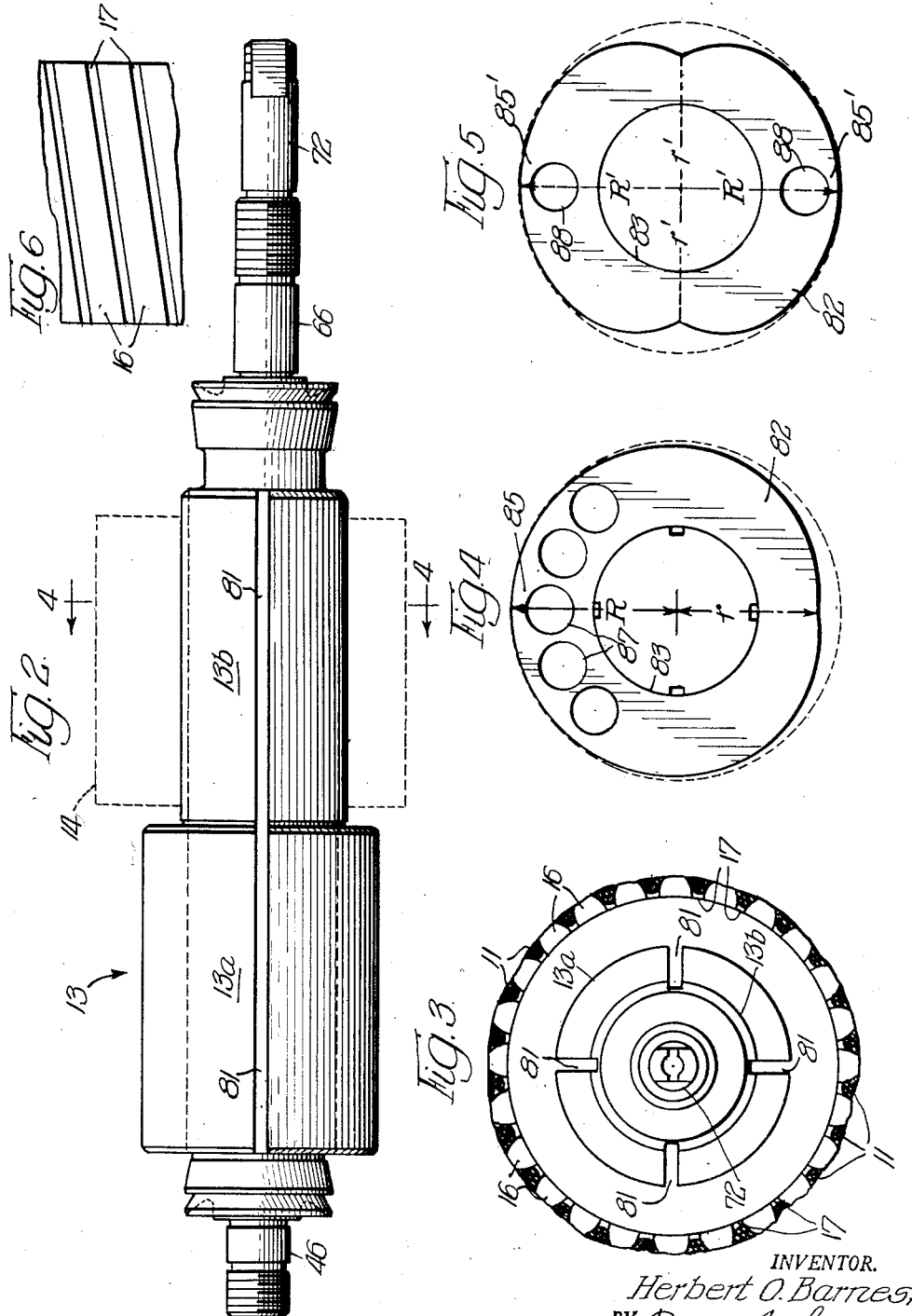

2,695,371
CONTROL TRANSFORMER AND GENERATOR

Herbert O. Barnes, Springfield, Ill., assignor to Sangamo Electric Company, Springfield, Ill., a corporation of Illinois Application January 18, 1951, Serial No. 206,657

8 Claims. (Cl. 310—168)

The present invention relates to an improved control transformer and generator, characterized by a complete absence of rotating windings, slip rings and brushes.

One of the objects of the invention is to provide such a device adapted to function as an electric generator capable of generating polyphase currents of sinusoidal or other desired wave form, such as might be used as a sweep generator for cathode ray oscillograph tubes.

Another object of the invention is to provide such a device adapted to function in a brushless synchro or autosyn system, wherein rotative movement at a transmitter or master unit is synchronously maintained at one or more controlled units electrically connected with the master unit.

Another object of the invention is to provide such a device adapted to function in a brushless servo system, wherein rotative movement at a transmitter is also maintained at a controlled unit, but in which the torque requirements at the controlled unit are relatively large, or are larger than the torque effective at the transmitter.

My improved device affords a better sweep generator, synchro, servo, control transformer or the like by reason of the absence of all windings on the rotor and all slip rings, brushes and the like. This means that there is no brush wear, and no chattering or irregular contact of brushes on slip rings. Still further, there is no friction between slip rings and brushes to retard rotary movement of the rotor. Hence, these devices of my invention are particularly useful for applications where the mechanical load introduced by the data device is required to be extremely small.

Other objects, features and advantages of the invention will appear from the following detail description of certain preferred embodiments of the invention. In the accompanying drawings illustrating such embodiments:

Figure 1 is an axial sectional view through the main unit comprising the exciting winding, the stator windings and the rotor which magnetically couples these windings;

Figure 2 is a side elevational view of the rotor alone, before applying thereto the laminations which effect the sinusoidal distribution of flux to the stator windings, one such assembly of laminations being diagrammatically indicated in outline by the dotted lines;

Figure 3 is an end elevational view of this bare rotor, as viewed from the right hand end of Figure 2;

Figure 4 is a transverse sectional view through the rotor, corresponding to a section taken approximately in the plane of the line 4—4 of Figure 2, showing the use of single lobe laminations which produce a single lobe rotor portion effecting the flux distribution in a 2 pole rotor and stator combination;

Figure 5 is a view similar to Figure 4, but showing double lobe laminations in the rotor for effecting the flux distribution in a 4 pole rotor and stator combination;

Figure 6 is a fragmentary view inside the laminated stator structure, showing the skewed or inclined slope of the stator teeth;

Figure 7 is a diagram showing the use of my improved device as a sweep generator for a cathode ray oscillograph tube;

Figure 8 is a diagram showing the use of my devices in a brushless synchro system; and Figure 9 is a diagram showing the use of my devices in a brushless servo system.

Referring first to Figure 1, the main elements of my invention comprise a stator structure 10, a group of polyphase field windings 11 carried by said stator structure 10, a stationary exciting coil or winding 12 mounted coaxially of said polyphase field windings 11 but in axially displaced relation thereto, and a rotor 13 extending axially through said polyphase field windings and through said exciting coil and carrying a lobe structure 14 which coacts with the polyphase field windings 11 for obtaining a particular flux distribution. That portion of the stator structure 10 which carries the stator windings 11 is preferably of laminated construction, comprising a group of ring laminae 15 held together and each provided with inwardly facing annularly spaced pole teeth 16 (Figure 3), between which are the tooth spaces 17 for receiving the polyphase windings 11. The polyphase windings may be wound or arranged with respect to the stator pole teeth 16 and slots 17 in different forms or arrangements; one conventional form, for example, being a two pole, three phase, Y-connected system. The stator teeth 16 are preferably given a slightly inclined pitch or spiral skew in the lengthwise direction, as fragmentarily illustrated in Figure 6, so that the approach of the lobe structure 14 toward each pole tooth 16 occurs gradually from one end of the pole tooth toward the other end thereof, for the purpose of presenting to the rotor the equivalent of a smooth uniform cylindrical surface, permitting the attainment of true sinusoidal characteristics. Mounting rings 21 and 22 abut the opposite end faces of the stack of stator laminae 15, and serving to bind the stator laminae 15 and these two end rings 21 and 22 together is a cylindrical shell 23 of magnetic metal. This cylindrical shell has its ends crimped or spun inwardly at 24 and 25 to overlap external shoulders formed on the end rings 21 and 22, and the inner cylindrical surface of the shell 23 has good magnetic contact with the laminations 15.

The magnetic circuit of the stator laminae 15 and stator windings 11 continues through the outer cylindrical shell 23 to a low loss high permeability magnetic end bell or end cap 27, as indicated in dotted lines in Figure 1. This end bell 27 is detachably secured to the left hand end ring 21 by screws 28 which pass through the end bell and through the inwardly turned flange 24 of shell 23 and thence thread into tapped bores 29 in the ring 21. This construction clamps the inwardly turned flange 24 between the end face of the end bell 27 and the opposing end face of the ring 21. The left hand end of the end bell 27 terminates in a magnetic annulus or pole 31 which closely surrounds the left hand end portion 13a of the rotor 13. The magnetic circuit of the stator structure continues through this magnetic annulus 31 and through the adjacent left hand end portion 13a of the rotor, and thence back to the right hand end portion 13b of the rotor, as indicated in dotted lines in Figure 1. This magnetic flux functions as the exciting flux for the device, and is generated by the stationary exciting winding 12 which coaxially surrounds the left hand rotor portion 13a in the space between the stator laminations 15 and the magnetic annulus 31 of the end bell 27. The exciting coil 12 is wound on a cylindrical coil form 33 having its inner surface in close proximity to the rotor portion 13a and comprising a mounting end flange 34 which is suitably secured by screws 35 or the like to the inner face of the annulus 31. A narrow cylindrical air gap g prevails between the left hand end portion 13a of the rotor and the magnetic annulus 31 and coil form 33.

Projecting outwardly from the left of the annulus 31 is a cylindrical ring member 37, which can either be formed integral with the end bell 27, or can be constructed in the form of a separate piece adapted to be secured thereto by the cap screws 38. Carried by this ring member 37 is a bearing support ring 41 which is releasably anchored in place in the member 37 by a releasable set screw anchorage indicated at 42. The bearing support ring 41 carries a suitable antifriction bearing, such as a ball bearing 45, in which is mounted the reduced left end portion 46 of the rotor. Nuts 47 screwing over a threaded extremity of the rotor shaft 46 engage the inner race of the bearing 45 and hold the rotor against axial displacement toward the right. Mounted over the left hand end of the cylindrical extension portion 37 is an end cap 51 composed of insulation and carrying on its exterior surface the terminal connections 52 through which electrical connection is established with the polyphase stator windings 11 and the stationary exciting winding 12. One of the conductors leading from one of these connector terminals to one of the windings is indicated at 53. This end cap 51 closes the left hand end of the assembly against the entrance of dirt, moisture, or any other foreign matter.

Referring now to the right hand end of the assembly, 61 is an end bell or closure cap which is secured over this end of the assembly by screws 62 which pass through the inwardly crimped end flange 25 of shell 23 and screw into tapped bores 63 in the right hand end ring 22. This right hand bell or closure cap 61 is preferably composed of aluminum or other non-magnetic material. Supported in an axial hub 64 of this end head are suitable antifriction bearings 65, 65, preferably ball bearings, which support the journal portion 66 of the rotor. An insulating end cap 67 is secured to the outer face of the end head 61 by cap screws 68 and serves to hold the bearings 65 in place. Nuts 71 screwing over a threaded portion of the rotor shaft lock the inner races of the bearings to the rotor shaft. The projecting outer portion 72 of the rotor shaft has mounted thereon a suitable driving element preferably in the form of a skew type of spur gear 74, preferably composed of insulating material, rawhide or the like for quiet operation.

Referring now more particularly to the construction of the rotor 13, every effort is made to reduce hysteresis and eddy current losses in the core of this rotor to a minimum. Accordingly, I prefer to construct it of a soft iron, typically represented by a 2% silicon iron, or of a compressed powdered iron. The large core diameter 13a and the smaller core diameter 13b constitute a continuous integral structure, and a series of angularly spaced slots 81 extend longitudinally of both diameters for the purpose of reducing eddy currents in the rotor core. When the unit is used as a sweep generator with saw-toothed excitation, the flux must be decreased to zero rapidly, which would be prevented if eddy currents were appreciable in the core during such periods.

The lobe structure 14 is mounted upon the smaller right hand end 13b of the rotor core, and is made up of the side-by-side stack of silicon steel sheet laminations 82 each having a cylindrical mounting aperture 83 therein (Figures 4 and 5) adapted to have a pressed fit or other rigid mounting over the smaller end 13b of the rotor core.

In Figure 4 I have shown the rotor laminations 82 formed with a single lobe 85 having a maximum radius R and a minimum radius r. This single lobe 85 is symmetrical in the sense that both the leading and trailing slopes of the lobe have the same rate or proportion of continuously diminishing radius from the angular reference axis of the maximum radius R to the minimum radius r, such preferably being proportioned to produce under the magnetizing force of the exciting winding 12 a substantially sinusoidal flux distribution in the stator windings 11 for producing a sinusoidal wave form in the output from the windings 12. This single lobe construction 85 of Figure 4 is particularly intended for a 2-pole rotor and stator combination. The series of holes 87 in each rotor lamination 82 is provided for the purpose of balancing the single lobe of the rotor. For the purpose of facilitating the construction of such single lobe rotor by one skilled in the art, I have appended below a typical table of angle and radius data, exemplified by a rotor having a maximum radius R of .8625 inch and a minimum radius r of .7345 inch:

In Figure 5 I have illustrated the rotor laminations formed with two diametrically opposite lobes 85', 85', particularly intended for a 4-pole rotor-stator combination. The maximum radii R', R' of these two lobes diminish symmetrically in their leading and trailing slopes to the two minimum radii r', r', disposed midway between the maximum radii R', R' in such rate or proportion as to produce under the magnetizing force of the exciting winding 12 a substantially sinusoidal flux distribution through the gap g' into the stator windings 11 in a 4-pole rotor-stator combination. The diametrically opposite holes 88 in the two lobes are solely for the purpose of aligning the laminations on the rotor shaft. A typical table of angle and radius data for such a 2-lobe rotor having a maximum radius R' of .8627 inch and a minimum radius r' of .6973 inch is set forth below:

Table II

| Angle, degrees | Radius, inches | Angle, degrees | Radius, inches |
|---|---|---|---|
| 0–180– | .8627 | 46–134–226–314 | .8497 |
| 1–179–181–359 | .8627 | 47–133–227–313 | .8488 |
| 2–178–182–358 | .8627 | 48–132–228–312 | .8479 |
| 3–177–183–357 | .8627 | 49–131–229–311 | .8469 |
| 4–176–184–356 | .8627 | 50–130–230–310 | .8459 |
| 5–175–185–355 | .8626 | 51–129–231–309 | .8448 |
| 6–174–186–354 | .8626 | 52–128–232–308 | .8436 |
| 7–173–187–353 | .8625 | 53–127–233–307 | .8424 |
| 8–172–188–352 | .8625 | 54–126–234–306 | .8411 |
| 9–171–189–351 | .8624 | 55–125–235–305 | .8397 |
| 10–170–190–350 | .8623 | 56–124–236–304 | .8382 |
| 11–169–191–349 | .8622 | 57–123–237–303 | .8366 |
| 12–168–192–348 | .8621 | 58–122–238–302 | .8349 |
| 13–167–193–347 | .8620 | 59–121–239–301 | .8331 |
| 14–166–194–346 | .8619 | 60–120–240–300 | .8312 |
| 15–165–195–345 | .8618 | 61–119–241–299 | .8291 |
| 16–164–196–344 | .8617 | 62–118–242–298 | .8269 |
| 17–163–197–343 | .8615 | 63–117–243–297 | .8245 |
| 18–162–198–342 | .8614 | 64–116–244–296 | .8220 |
| 19–161–199–341 | .8612 | 65–115–245–295 | .8193 |
| 20–160–200–340 | .8610 | 66–114–246–294 | .8164 |
| 21–159–201–339 | .8608 | 67–113–247–293 | .8132 |
| 22–158–202–338 | .8606 | 68–112–248–292 | .8099 |
| 23–157–203–337 | .8604 | 69–111–249–291 | .8062 |
| 24–156–204–336 | .8601 | 70–110–250–290 | .8024 |
| 25–155–205–335 | .8599 | 71–109–251–289 | .7983 |
| 26–154–206–334 | .8596 | 72–108–252–288 | .7940 |
| 27–153–207–333 | .8593 | 73–107–253–287 | .7893 |
| 28–152–208–332 | .8590 | 74–106–254–286 | .7842 |
| 29–151–209–331 | .8587 | 75–105–255–285 | .7789 |
| 30–150–210–330 | .8584 | 76–104–256–284 | .7733 |
| 31–149–211–329 | .8580 | 77–103–257–283 | .7671 |
| 32–148–212–328 | .8577 | 78–102–258–282 | .7609 |
| 33–147–213–327 | .8573 | 79–101–259–281 | .7545 |
| 34–146–214–326 | .8569 | 80–101–260–280 | .7477 |
| 35–145–215–325 | .8565 | 81– 99–261–279 | .7407 |
| 36–144–216–324 | .8560 | 82– 98–262–278 | .7337 |
| 37–143–217–323 | .8555 | 83– 97–263–277 | .7268 |
| 38–142–218–322 | .8550 | 84– 96–264–276 | .7201 |
| 39–141–219–321 | .8545 | 85– 95–265–275 | .7139 |
| 40–140–220–320 | .8539 | 86– 94–266–274 | .7084 |
| 41–139–221–319 | .8532 | 87– 93–267–273 | .7037 |
| 42–138–222–318 | .8526 | 88– 92–268–272 | .7002 |
| 43–137–223–317 | .8519 | 89– 91–269–271 | .6981 |
| 44–136–224–316 | .8512 | 90–270 | .6973 |
| 45–135–225–315 | .8505 | | |

It will be understood that other lobe formations may be employed for obtaining other flux distributions to the stator windings, or other wave forms in the output from these windings, or other synchronizing effects between these windings and the angular positions of the rotor.

Table I

| Angle | | Radius | Angle | | Radius | Angle | | Radius | Angle | | Radius |
|---|---|---|---|---|---|---|---|---|---|---|---|
| 0 | 360 | .8625 | 48 | 312 | .8600 | 93 | 267 | .8493 | 138 | 222 | .8099 |
| 3 | 357 | .8625 | 51 | 309 | .8596 | 96 | 264 | .8480 | 141 | 219 | .8048 |
| 6 | 354 | .8625 | 54 | 306 | .8592 | 99 | 261 | .8465 | 144 | 216 | .7993 |
| 9 | 351 | .8625 | 57 | 303 | .8588 | 102 | 258 | .8450 | 147 | 213 | .7935 |
| 12 | 348 | .8624 | 60 | 300 | .8583 | 105 | 255 | .8434 | 150 | 210 | .7873 |
| 15 | 345 | .8623 | 63 | 297 | .8578 | 108 | 252 | .8416 | 153 | 207 | .7806 |
| 18 | 342 | .8622 | 66 | 294 | .8572 | 111 | 249 | .8394 | 156 | 204 | .7739 |
| 21 | 339 | .8621 | 69 | 291 | .8566 | 114 | 246 | .8372 | 159 | 201 | .7669 |
| 24 | 336 | .8620 | 72 | 288 | .8560 | 117 | 243 | .8348 | 162 | 198 | .7600 |
| 27 | 333 | .8618 | 75 | 285 | .8553 | 120 | 240 | .8322 | 165 | 195 | .7532 |
| 30 | 330 | .8616 | 78 | 282 | .8545 | 123 | 237 | .8293 | 168 | 192 | .7471 |
| 33 | 327 | .8614 | 81 | 279 | .8536 | 126 | 234 | .8260 | 171 | 189 | .7418 |
| 36 | 324 | .8611 | 84 | 276 | .8526 | 129 | 231 | .8225 | 174 | 186 | .7378 |
| 39 | 321 | .8609 | 87 | 273 | .8516 | 132 | 228 | .8186 | 177 | 183 | .7353 |
| 42 | 318 | .8606 | 90 | 270 | .8505 | 135 | 225 | .8145 | 180 | 180 | .7345 |
| 45 | 315 | .8603 | | | | | | | | | |

Angle is from reference axis.

The excitation of the exciting winding 12, and the driven or driving relation of the rotor shaft 72 depend upon the use to which the device is put. The exciting winding 12 may be energized with single phase alternating current, direct current, pulsating current, etc., depending upon such use. The magnetic circuit of the stator and the rotor is indicated by the directional arrows in Figure 1, comprising flux generated in the large rotor portion 13$a$ by the exciting winding 12, such flux passing through the smaller rotor portion 13$b$ and lobe structure 14, thence acros gap $g'$, thence pasing through stator laminations 15 and stator windings 11, thence passing through cylindrical shell 23, and then end bell 27 and annulus 31 across gap $g$ back to the large portion 13$a$ of the rotor core. When the device is to be operated as an ordinary alternator, the exciting winding 12 is excited by direct current, thereby resulting in a flux interlinkage between the rotor and the stator through the path just traced. Obviously, the flux flow may be in either direction, depending upon the polarity of the direct current connections to the exciting coil 12. Rotation of the rotor through shaft 72 will result in the generation of alternating current voltages in the stator windings 11 in accordance with the particular design under consideration. When the device is used as a synchro transmitter or autosyn, there will be two or more of these devices interconnected, the exciting windings 12 of each device being connected to a single phase alternating current supply, and the stator windings 11 of these several devices being interconnected, so that the rotation of the rotor shaft 72 of the main or master unit will result in corresponding rotation of the other synchros to which the stator windings of the master synchro are connected. Certain of such uses will now be described in connection with Figures 7, 8 and 9.

In Figure 7 I have diagrammatically illustrated the device used as a sweep generator for a cathode ray oscillograph tube indicated at 91, whereby a trace appearing on the tube indicates not only the instantaneous position of the rotor 13, but the magnitude of some quantity which is a function of the instantaneous current in the exciting winding 12 of the sweep generator thus connected to the cathode ray tube 91 through the line diagrammatically indicated at 92. The tube 91 is shown as being of the magnetic deflection type, and the line 92 connects with the polyphase winding 93 of this tube for magnetic deflection. The elements of the brushless control transformer or sweep generator are illustrated diagrammatically, but the arrangement and operating relation will be evident from the preceding description. The rotor portion 13$a$ revolves in the exciting winding 12, and the lobe portion 14 of the rotor effects the previously described flux distribution in the stator windings 11. The lobe structure 14 may be either the single lobe of Figure 4 or the double lobe of Figure 5, but, in general, it will usually be of the single lobed type, and the polyphase stator windings 11 and the polyphase windings 93 of the cathode ray tube will have the same number of poles and be of approximately equal impedance. The polyphase windings 93 of the cathode ray tube 91 may be coupled through a suitable amplifier so designed that it does not disturb the desired phase relations. The rotor shaft 72 may be coupled to any rotating element whose position at any instant is to be indicated on the face 95 of the cathode ray tube. If the shaft 72 is rotating at a constant speed, and the exciting winding 12 is energized by a constant current $i$, the cathode ray tube 91 will be influenced in the following manner: The polyphase deflection windings 93 will be traversed by a polyphase current which will be a function of the exciting current $i$ traversing the exciting winding 12 and the speed of the shaft 72 in revolutions per minute. This gives rise to a rotating magnetic field within the cylindrical air gap of the deflection windings 93, which rotating magnetic field is in synchronism with the shaft 72 and of intensity varying with the polyphase currents in the coil. The electron beam focused on the screen 95, which is ordinarily centered at the central point designated O, will now be deflected to some position 96 away from the center O, and will be rotated at constant speed in synchronism with the rotation of the shaft 72. In the practical application of this type of equipment, use is frequently made of the fact that the current $i$ may be varied in accordance with time beginning at some instant $t_0$ and extending to some time $t_1$, and then repeated. This gives rise to the familiar saw-tooth pattern of current, and in such case the device is used as a sweep generator. Under such conditions, the radius of the circle in which the spot 96 travels from the position O at time $t_0$ and increases to some position 96, at time $t_1$. If the shaft 72 is rotating at a uniform speed, it will be clear that the spot 96 traces a spiral pattern which is repeated for each cycle through which the current $i$ passes. In "Sonar" echo ranging, it is necessary to know the range or distance of a target which is ascertained by the time of return of an echo beginning at the time $t_0$ when the sound impulse is initiated. The current $i$ is therefore started at this instant $t_0$ and the echo is recorded by automatically brightening the spot 96 at the instant that it is received. The radius of the spot from the center O not only gives the range, but may give further information as to the instantaneous position of the shaft 5 at the moment of the signal's arrival. This is only one of the many uses to which the device as a generator may be employed.

In Figure 8 I have illustrated my invention in use in a brushless synchro system. Two or more of the improved devices are used in such a system, one serving as a transmitter, as indicated at the left in Figure 8, and one or more serving as receivers, as indicated at the right. A single phase supply line 101 is connected in parallel with the exciting windings 12 of all of the devices in the system, and the polyphase stator windings 11 of the transmitter are connected in parallel through conductors 102 with the similar or matching stator windings 11 of each of the other receiver units. The shaft 72 of the transmitter is coupled to a device whose rotation is to be repeated at one or more receivers. These receivers, acting under the influence of the common supply line 101 and the currents generated in the stator windings 11 of the transmitter, will position their shafts 72 in accordance with the position of the shaft 72 of the transmitter, at least within reasonable limits of torque loading on the receiver shafts. Ordinarily, the receivers are only required to carry relatively light mechanical loads, such as pointers, or similar positioning devices.

Where the torque requirements are considerably larger, I can adapt my improved devices to a brushless positioning servo system such as I have illustrated in Figure 9. In such a system, the stator windings 11 of the transmitter are connected through conductors 102 to the stator windings 11 of each of the receivers as previously described. However, in this embodiment, the supply line 101 has connection directly with the exciting winding 12 of the transmitter, but does not have direct connection with the exciting winding 12 of each receiver. Instead, this supply line 101 connects with one of the phases of a 2-phase motor 105 provided at each receiver. The other winding of the 2-phase motor 105 is connected through a servo amplifier 106 with the winding 12 of the receiver unit, it being understood that this arrangement is repeated at each of the receiver units. The rotation of a shaft 108 of motor 105 constitutes the output of the receiver. This shaft 108 has a connection 109, preferably in the form of a direct mechanical coupling, with the shaft 72 of the receiver. The mechanical coupling is here shown as a direct connection, but it is to be understood that any convenient ratio may be interposed between the shafts and the motor 105, but, in general, such that the shafts 109 and 108 are geared in the same ratio to the motor 105. It will be assumed that the shaft 72 of the transmitter is driven by some instrument or device whose rotation is to be remotely repeated at one or more receivers. It will be further assumed that the remote indicator requires far more power for its actuation than may be drawn from the instrument which is serving to drive the shaft 72 of the transmitter. In the illustrated arrangement, the alternating current voltage developed in the winding 12 of the receiver will depend upon the position of its shaft 72, which varies harmonically in intensity as the shaft is rotated through one revolution. Since the directional sense of the voltage changes with respect to the voltage in line 101 as it passes through O, this fact is made use of in controlling the positioning of the output shaft 108 of the receiver. As previously described, the motor 105 is to be considered as a 2-phase motor with one of its field windings connected to the line 101 and with the other winding connected to the servo amplifier 106, whose voltage developed under the influence of the voltage in winding 12 of the receiver is in quadrature with the voltage in supply line 101. When the voltage in winding 12 of the receive ris at a 0 value, then only one winding of the motor 105 is excited, and there is no tendency for rotation. When, due to any difference in the positioning of the shaft 72 of the transmitter and the shaft 72 of the receiver, a voltage appears in the winding 12 of the receiver, which voltage is applied to the servo amplifier 106, this results in a flow of current to the other winding of motor 105, causing it to rotate in a direction to align the shaft 72 of the receiver with that of the shaft 72 of the transmitter. As a consequence, shaft 108 will also be rotated by the motor 105 to a similar position. Thus, a servo system is obtained in which relatively heavy torque loads may be sustained by the shaft 108.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a device of the class described, the combination of a stator structure, a rotor rotatably mounted in said stator structure, a stationary exciting winding in said stator structure disposed coaxially of said rotor, and stationary stator windings in said stator structure disposed coaxially of said exciting winding and of said rotor, said rotor comprising a revolving cylindrical flux receiving portion at one end and a rotating lobed flux distributing portion at the other end, said cylindrical flux receiving portion revolving axially within said stationary exciting winding and said lobed flux distributing portion of said rotor revolving within said stationary stator windings, whereby flux generated by said exciting winding enters said rotor at one end through said revolving cylindrical flux receiving portion and travels lengthwise of said rotor and is distributed between the other end of said rotor and said stator windings through said lobed flux distributing portion, said lobed means being so shaped as to effect a substantially sinusoidal distribution of the flux between said rotor and said stator windings.

2. In a device of the class described, the combination of a stator structure, a rotor rotatably mounted in said stator structure, a stationary exciting winding in said stator structure disposed coaxially of one end of said rotor, and stationary stator windings in said stator structure disposed coaxially of said exciting winding at the other end of said rotor, said rotor comprising a revolving cylindrical flux receiving portion at one end revolving axially within said exciting winding for receiving excitation flux from said winding, said rotor comprising a revolving flux distributing portion at its other end revolving within said stationary stator windings, whereby flux generated by said exciting winding enters said rotor at one end through said cylindrical flux receiving portion and travels lengthwise of said rotor and is distributed between the other end of said rotor and said stator windings through said flux distributing portion, said flux distributing portion comprising a lobe formation having a maximum radius diminishing to a minimum radius substantially in proportion to effect a sinusoidal distribution of the flux between said rotor and said stator windings.

3. In a device of the class described, the combination of a stator structure, polyphase field windings mounted in said stator structure, a stationary exciting coil in said stator structure disposed coaxially of said field windings but in axially displaced relation thereto, means for energizing said exciting coil with a direct current, a rotor having one end rotating within said exciting winding and having its other end rotating within said field windings, and a lobe structure on the latter end of said rotor coacting with the direct current excitation of said exciting coil for effecting a substantially sinusoidal flux distribution in said field windings.

4. In a device of the class described, the combination of a stator structure, a ring of stator pole teeth therein, polyphase field windings carried by said pole teeth, a stationary exciting coil carried by said stator structure disposed coaxially of said ring of pole teeth but displaced axially therefrom, means for energizing said exciting coil with a direct current, a rotor having one end rotating within said exciting coil and having its other end rotating within said ring of stator pole teeth, and laminations on the latter end of said rotor of lobe shaped perimeter for effecting a substantially sinusoidal distribution of the exciting coil's direct current flux between the latter end of said rotor and said ring of stator pole teeth.

5. In a device of the class described, the combination of a stator structure, a ring of stator pole teeth, a stationary exciting coil carried by said stator structure disposed coaxially of said ring of pole teeth but displaced axially therefrom, a rotor having one end rotating within said exciting coil and having its other end rotating within said ring of stator pole teeth, and laminations on the latter end of said core having their perimeters shaped with two lobes both revolving in the same plane of rotation, said two lobes having two diametrically opposite maximum diameters diminishing to two diametrically opposite minimum diameters all revolving in the same plane of rotation and so proportioned with respect to radius and angle as to effect a substantially sinusoidal flux distribution between the rotor and said ring of stator pole teeth.

6. In a device of the class described, the combination of a stator structure, a rotor rotatably mounted in said stator structure, a stationary exciting winding in said stator structure disposed coaxially of one end of said rotor, stationary stator windings in said stator structure disposed coaxially of said exciting winding at the other end of said rotor and connected in a three-phase Y-connected system, said rotor comprising a revolving cylindrical flux receiving portion at one end revolving within said excitation coil and a flux distributing portion at its other end revolving within said stator windings, whereby flux generated by said exciting winding enters said rotor at one end through said revolving cylindrical flux receiving portion and travels lengthwise of said rotor and then passes outwardly from the other end of said rotor through said revolving flux distributing portion to said stator windings and thence through said stator structure back to the first end of said rotor, and lobe means on the flux distributing portion of said rotor having a maximum radius diminishing to a minimum radius substantially in proportion to the angle-radius data set forth in Table I of the present specification for effecting a substantially sinusoidal distribution of flux between said rotor and said stator windings.

7. In a device of the class described, the combination of a stator structure, a rotor rotatably mounted in said stator structure, a stationary exciting winding in said stator structure disposed coaxially of one end of said rotor, stationary stator windings in said stator structure disposed coaxially of said exciting winding at the other end of said rotor and connected in a three-phase system, said rotor establishing a rotating magnetic coupling between said stationary exciting winding and said stationary stator windings, whereby flux generated by said exciting winding enters said rotor at one end and travels lengthwise of said rotor and then passes outwardly from the other end of said rotor through said stator windings and thence through said stator structure back to the first end of said rotor, and two lobes on the latter end of said rotor both revolving in the same transverse plane of rotation within said stationary stator windings, said lobes having two diametrically opposite maximum diameters diminishing to two diametrically opposite minimum diameters substantially in proportion to the angle radius data set forth in Table II of the present specification for effecting a substantially sinusoidal distribution of the flux between said rotor and said stator windings.

8. In a device of the class described, the combination of a stator structure, polyphase field windings carried by said stator structure, a stationary exciting coil carried by said stator structure disposed coaxially of said field windings but displaced axially with respect thereto, means for energizing said exciting coil with a direct current, a rotor having one end rotating within said exciting winding and having its other end rotating within said field windings, a lobe structure on the latter end of said rotor coacting with the direct current excitation of said exciting coil, for effecting a substantially sinusoidal flux distribution in said field windings to produce a sinusoidal wave form alternating current output from said field windings, and pole teeth on said stator structure skewed at an angle to the axis of said lobe structure for the purpose of presenting to the rotor the equivalent of a smooth uniform cylindrical surface, permitting the attainment of true sinusoidal characteristics.

References Cited in the file of this patent

UNITED STATES PATENTS

| Number | Name | Date |
|---|---|---|
| 1,562,917 | Richter | Nov. 24, 1925 |
| 1,895,942 | Rowell | Jan. 31, 1933 |
| 2,446,290 | Lovegrove | Aug. 3, 1948 |
| 2,499,349 | Ayres | Mar. 7, 1950 |